July 21, 1970  TAKASHI UMEMORI ET AL  3,521,167
METHOD FOR MEASURING THE JUNCTION TEMPERATURE BY
UTILIZING A GATE-CATHODE CHARACTERISTIC OF
A SILICON CONTROLLED RECTIFIER
Filed March 15, 1967
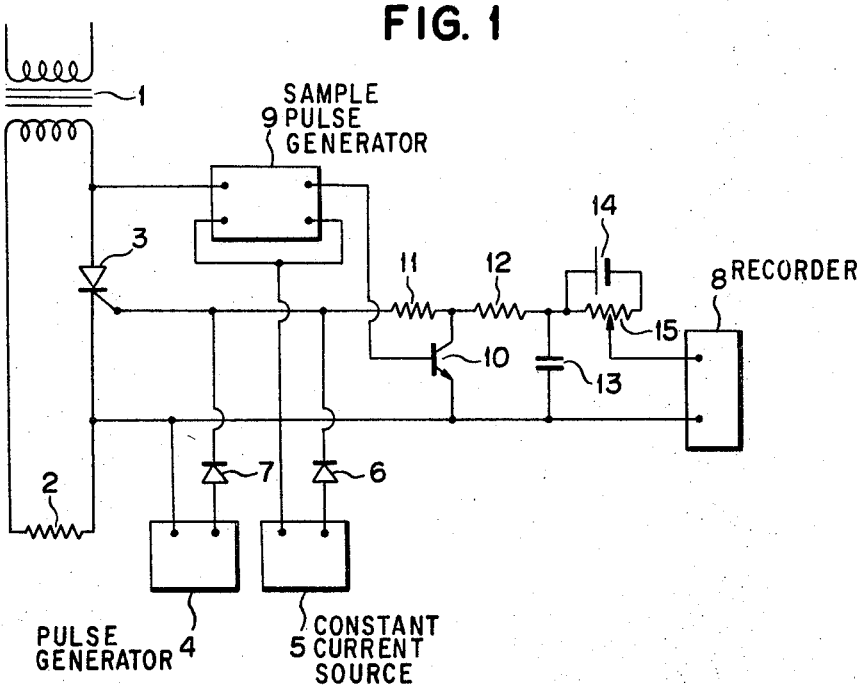
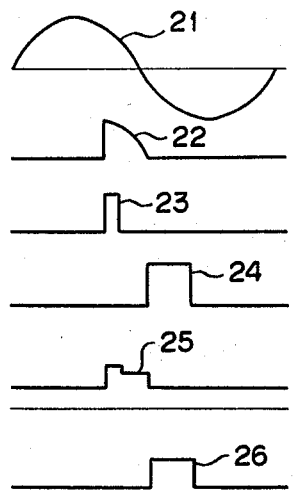
INVENTORS.
Takashi Umemori
and Ukyo Konishi
BY United States Patent Office 3,521,167
Patented July 21, 1970

3,521,167
METHOD FOR MEASURING THE JUNCTION TEMPERATURE BY UTILIZING A GATE-CATHODE CHARACTERISTIC OF A SILICON CONTROLLED RECTIFIER
Takashi Umemori and Ukyo Konishi, Tokyo, Japan, assignors to Japanese National Railways, a corporation of Japan
Filed Mar. 15, 1967, Ser. No. 623,295
Claims priority, application Japan, Mar. 16, 1966, 41/15,831
Int. Cl. G01r 31/22
U.S. Cl. 324—158    5 Claims

ABSTRACT OF THE DISCLOSURE

A method of measuring the junction temperature of an SCR in its operating circuit environment. A constant current, less than the minimum firing current, is applied between the gate and the cathode of the SCR, and the junction temperature of the SCR is determined from the gate to the cathode voltage of the SCR during intervals when anode current is not flowing.

---

A prior art method for measuring the junction temperature of a silicon controlled rectifier (SCR) comprises passing a fixed measuring current of $\frac{1}{100}$–$\frac{1}{1000}$ of rated current between the anode and the cathode of the SCR, measuring the voltage drop due to a measuring forward current (a fixed current) when a load forward current is stopped, and estimating the junction temperature by previously calibrating a relation against junction temperature.

This prior are method has the following disadvantages.

(1) The forward voltage drop resulting from forward measuring current does not vary linearly with respect to the junction temperature thus making and calculation of the junction temperature laborious and subject to error.

(2) It is necessary to insert a switching diode having a similar current capacity in series with the SCR being measured.

(3) It is difficult to measure the junction temperature of an SCR in a rectifier device including a large number of SCR's during an ordinary operation. In fact, when the number of series connections in the rectifier device is unity, it is impossible to measure the junction temperature during the ordinary operation. However, according to the present invention, when the SCR is unity, and a large number of SCR's are connected in series and parallel, the junction temperature may be measured during the ordinary operation without relation to the circuit condition.

An object of this invention is to provide a method of measuring the junction temperature of an SCR, said method having none of the previously stated disadvantages.

An object of this invention is to provide a method of measuring the junction temperature of an SCR without affecting its circuit operation.

An object of this invention is to provide a method of measuring the junction temperature of an SCR whether it be the sole SCR in a circuit or connected in series or parallel with other SCR's.

The above stated objects are accomplished by a method comprising the steps of applying between the gate and cathode of an SCR a constant current less than the firing current and sampling the voltage between the gate and the cathode during an interval when anode current does not flow, whereby the junction temperature of the SCR is determined from the variation of the mean value of the sampled voltage.

An embodiment of this invention will be described with reference to the accompanying drawings; in which:

FIG. 1 is a schematic circuit diagram of the present invention, and

FIG. 2 shows wave forms generated in several parts of FIG. 1.

In the drawings, 1 is a power source transformer, and its wave form 21 is shown in FIG. 2. A voltage applied to a load resistor 2 is controlled by an SCR 3 whose junction temperature is to be measured. The wave form 22 shown in FIG. 2 represents the voltage applied to the load resistor 2. The SCR element 3 is controlled by the phase of a gate pulse generator 4. The output of gate pulse generator 4 is represented by wave form 23 shown in FIG. 2. A constant measuring gate current is passed from a constant current source 5 through a diode 6 to the gate of the SCR 3 in a forward direction. The gate-cathode voltage resulting from this current is evident in wave form 25. However, the SCR 3 does not fire as a result of this measuring gate current. When the pulse signal 23 is applied from the gate pulse generator 4 through a diode 7 to the gate of the SCR 3 for ordinary working in the SCR equipment, the SCR 3 is fired and a current flows through the load resistor 2. Conduction of the SCR continues until the end of the half cycle when the voltage applied to the anode of the SCR becomes negative. If pulse 23 is again applied in a half cycle when the voltage applied to the anode of the SCR is positive, the SCR will again conduct. Thus, normal operation of the SCR is not affected by the presence or absence of the temperature measuring circuit.

When the voltage applied to the anode of the SCR goes negative, the pulse generator 9 produces at its output terminal a voltage pulse of a predetermined duration less than a half cycle of the source frequency. This output voltage, represented by wave form 24, is fed to the controlling input of a chopper circuit comprising a transistor 10 and a resistor 11. The voltage between the gate and the cathode of the SCR for one entire cycle of operation is shown by 25 in FIG. 2. The chopper circuit picks out or samples the voltage between the gate and the cathode of the SCR for only that portion in the reverse voltage period that corresponds to the duration of pulse 24. The wave form of the voltage as sampled by the chopper is shown by 26 in FIG. 2. In the circuit shown, the variation of the peak value of the wave form 26 is proportional to the junction temperature of the SCR. This voltage is made smooth by a smoothing circuit comprising a resistor 12 and a condenser 13 and is recorded by a direct current recorder 8 through a differential voltage circuit comprising a battery 14 and a variable resistor 15. The value measured by the direct current voltage recorder 8 is a function of junction temperature of the SCR being measured. By this relation previously calibrated for the state of the SCR not carrying a load forward current, the junction temperature of an SCR in operation can be measured.

Although the invention has been described with reference to a particular embodiment thereof, it may be modified in various ways without departing from the scope of the invention.

What is claimed is:

1. A method for measuring the junction temperature of a silicon controlled rectifier having an alternating voltage applied across the cathode-anode to alternately forward and then reverse bias said silicon controlled rectifier; and having a gating signal greater than the minimum signal required to fire said silicon controlled rectifier applied to the gate thereof during an interval of forward bias, whereby said silicon controlled rectifier may perform a work function during intervals of forward bias, said method comprising:

applying a measuring gate current less than the minimum firing current between the gate and the cathode of said silicon controlled rectifier;

sampling the voltage between the gate and the cathode during an interval when anode current does not flow; and converting said sampled voltage to a proportionate value representing said junction temperature.

2. Apparatus for measuring the junction temperature of a silicon controlled rectifier, said apparatus comprising:

means for applying a constant current less than the minimum firing current between the gate and the cathode of said silicon controlled rectifier;

means for sampling the voltage between the gate and the cathode during an interval when anode current does not flow;

means converting said sample voltage to a proportionate value representing said junction temperature;

said silicon controlled rectifier being connected in a circuit having means for applying between said gate and said cathode a gating signal greater than the minimum signal required to fire said silicon controlled rectifier, said gating signal being applied during intervals when said rectifier is forward biased, whereby said rectifier performs a work function during intervals when it is forward biased and the junction temperature is determined during intervals when said rectifier is reversed biased; and an alternating signal source for alternately forward and then reverse biasing said rectifier.

3. Apparatus as claimed in claim 2 wherein said sampling means comprises a pulse generator and a chopper circuit, said chopper circuit being responsive to said pulse generator for sampling the voltage between said gate and said cathode.

4. Apparatus as claimed in claim 2 wherein said converting means comprises a smoothing circuit responsive to said chopper circuit, a differential voltage circuit responsive to said smoothing circuit, and recording means responsive to said differential voltage circuit.

5. Apparatus as claimed in claim 3 wherein said alternating signal source is connected to the input of said pulse generator and to the anode of said silicon controlled rectifier whereby said pulse generator is triggered as said alternating signal reverse biases said anode.

References Cited

UNITED STATES PATENTS

| | | | |
|---|---|---|---|
| 3,206,675 | 9/1965 | Brunetto | 324—158 |
| 3,277,371 | 10/1966 | Marcus | 324—158 |
| 3,300,718 | 1/1967 | Umphrey | 324—72.5 |

OTHER REFERENCES

G.E. Controlled Rectifier Manual (1st edition), March 1960, pp. 198–200.

Raditronics, "Thermal Impedance of Silicon Rectifiers" (N. Smith et al.), February 1962, vol. 27, No. 2, pp. 26–27.

GERARD R. STRECKER, Primary Examiner

E. L. STOLARUN, Assistant Examiner